(12) United States Patent
Chen

(10) Patent No.: US 12,452,725 B2
(45) Date of Patent: Oct. 21, 2025

(54) METHOD FOR IDENTIFYING PROBLEM CELL, ELECTRONIC DEVICE AND COMPUTER-READABLE MEDIUM

(71) Applicant: ZTE CORPORATION, Shenzhen (CN)

(72) Inventor: Li Chen, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 537 days.

(21) Appl. No.: 17/995,884

(22) PCT Filed: Jan. 29, 2021

(86) PCT No.: PCT/CN2021/074431
§ 371 (c)(1),
(2) Date: Oct. 10, 2022

(87) PCT Pub. No.: WO2021/203810
PCT Pub. Date: Oct. 14, 2021

(65) Prior Publication Data
US 2023/0130378 A1    Apr. 27, 2023

(30) Foreign Application Priority Data
Apr. 10, 2020 (CN) .......................... 202010284448.6

(51) Int. Cl.
*H04W 28/02* (2009.01)
*H04W 36/06* (2009.01)

(52) U.S. Cl.
CPC ....... *H04W 28/0268* (2013.01); *H04W 36/06* (2013.01)

(58) Field of Classification Search
None
See application file for complete search history.

(56) References Cited

U.S. PATENT DOCUMENTS

2010/0054140 A1    3/2010   Stjernholm et al.
2010/0313070 A1   12/2010   Joshi et al.
(Continued)

FOREIGN PATENT DOCUMENTS

CN    104469833 A    3/2015
CN    105517021 A    4/2016
(Continued)

OTHER PUBLICATIONS

CN 109963301A English Translation (Year: 2019).*
(Continued)

*Primary Examiner* — Saumit Shah
(74) *Attorney, Agent, or Firm* — Vivacqua Crane, PLLC

(57) ABSTRACT

A method for identifying a problem cell, an electronic device and a computer-readable medium Said method comprises: determining the anomaly contribution degree of each cell in a subnet (S101); and determining at least one cell as a problem cell according to the anomaly contribution degree of each cell in the subnet (S102); the anomaly contribution degree of each cell refers to, when the key performance indicator of the subnet is anomalous, the degree of correlation between the key performance indicator of the cell and the anomaly; the key performance indicator of the subnet being anomalous means that the key performance indicator of the subnet exceeds a first threshold range; the key performance indicator of the subnet is determined according to parameter statistics of cells therein; and the key performance indicator of the cell is determined according to parameter statistics therein. Disclosed are a method for identifying a problem cell, an electronic device, and a non-transitory computer-readable medium. The method includes: determining an anomaly contribution degree of each cell in a subnet; and determining at least one cell as a
(Continued)

problem cell according to the anomaly contribution degree of each cell in the subnet.

16 Claims, 4 Drawing Sheets

(56) References Cited

U.S. PATENT DOCUMENTS

| | | | |
|---|---|---|---|
| 2013/0053023 A1 | 2/2013 | Meredith et al. | |
| 2014/0337490 A1* | 11/2014 | Zhao | H04W 84/18 709/220 |
| 2015/0024735 A1* | 1/2015 | Ibbotson | H04W 24/04 455/423 |
| 2016/0088502 A1 | 3/2016 | Sanneck et al. | |
| 2016/0277946 A1* | 9/2016 | Sofuoglu | H04W 24/02 |
| 2017/0094537 A1* | 3/2017 | Yang | H04L 41/0631 |
| 2019/0239101 A1* | 8/2019 | Ouyang | G06N 3/084 |
| 2020/0275285 A1* | 8/2020 | Li | H04B 7/02 |

FOREIGN PATENT DOCUMENTS

| | | |
|---|---|---|
| CN | 107517469 A | 12/2017 |
| CN | 108243448 A | 7/2018 |
| CN | 109951856 A | 6/2019 |
| CN | 109963301 A | 7/2019 |
| CN | 109995599 A | 7/2019 |
| CN | 110635952 A | 12/2019 |
| EP | 3525507 A1 | 8/2019 |
| JP | 2001230737 A | 8/2001 |
| JP | 2009071428 A | 4/2009 |
| JP | 2011070492 A | 4/2011 |
| JP | 2012501573 A | 1/2012 |
| JP | 2016092805 A | 5/2016 |
| JP | 2017208717 A | 11/2017 |
| WO | 2007034650 A1 | 3/2007 |
| WO | 2010090179 A1 | 8/2010 |

OTHER PUBLICATIONS

CN 109995599A English Translation (Year: 2019).*
European Patent Office. Extended European Search Report for EP Application No. 21783685.7, mailed Jul. 7, 2023, pp. 1-10.
International Searching Authority. International Search Report and Written Opinion for PCT Application No. PCT/CN2021/074431 and English translation, mailed Mar. 21, 2021, pp. 1-9.
Industrial Property Cooperation Center (IPCC). Search Report for JP Application No. 2022-560979 and English translation, mailed Sep. 12, 2023, pp. 1-21.
Japan Patent Office. Notice of Reasons for Refusal for JP Application No. 2022-560979 and English translation, mailed Oct. 4, 2023, pp. 1-6.
3GPP Technical Specification Group Radio Access Network. "Cell Search Performance in Tightly Synchronized Network for E-UTRA," 3GPP TSG RAN WG1 Meeting #46, R1-062008, 2006, pp. 1-7.
The State Intellectual Property Office of People's Republic of China. First Office Action and Search Report for CN Application No. 202010284448.6 and English translation, mailed May 29, 2025, pp. 1-14.

* cited by examiner

METHOD FOR IDENTIFYING PROBLEM CELL, ELECTRONIC DEVICE AND COMPUTER-READABLE MEDIUM

CROSS REFERENCE TO RELATED APPLICATIONS

This application is a national stage filing under 35 U.S.C. § 371 of international application number PCT/CN2021/074431, filed Jan. 29, 2021, which claims priority to Chinese patent application No. 202010284448.6, filed Apr. 10, 2020. The contents of these applications are incorporated herein by reference in their entirety.

TECHNICAL FIELD

Embodiments of the present disclosure relate to the technical field of mobile communication, and particularly to a method for identifying a problem cell, an electronic device, and a non-transitory computer-readable medium.

BACKGROUND

In a mobile communication network (e.g., a mobile broadband (MBB) network), when a Key Performance Indicator (KPI), such as the connection rate, call drop rate, congestion rate, handover success rate, traffic, and bit rate, of a subnet exceeds a predetermined range, it is considered that an anomaly occurs in the subnet. Generally, the anomaly of the subnet is mainly caused by a problem of one or more cells. Such cells are called problem cells, or are called top N poorest cells, which are generally cells with poor key performance indicators.

Therefore, it is very important to accurately locate an anomalous problem cell to optimize the network and improve the user experience.

SUMMARY

Embodiments of the present disclosure provide a method for identifying a problem cell, an electronic device, and a non-transitory computer-readable medium.

In accordance with an aspect of the present disclosure, an embodiment provides a method for identifying a problem cell. The method may include: determining an anomaly contribution degree of each cell in a subnet; and determining at least one cell as a problem cell according to the anomaly contribution degree of each cell in the subnet, where the anomaly contribution degree of each cell is, when an anomaly occurs in a key performance indicator of the subnet, a degree of correlation between a key performance indicator of the cell and the anomaly; the key performance indicator of the subnet being anomalous means that the key performance indicator of the subnet exceeds a first threshold range; the key performance indicator of the subnet is determined according to parameter statistics of the cells in the subnet; and the key performance indicator of the cell is determined according to parameter statistics in the cell.

In accordance with another aspect of the present disclosure, an embodiment provides an electronic device. The electronic device may include: one or more processors; a memory, storing one or more programs which, when executed by the one or more processors, cause the one or more processors to implement the method for identifying a problem cell; and one or more I/O interfaces, connected between the one or more processors and the memory, and configured to implement information exchange between the one or more processors and the memory.

In accordance with another aspect of the present disclosure, an embodiment provides a computer-readable medium, storing a computer program which, when executed by a processor, causes the processor to implement the method for identifying a problem cell.

BRIEF DESCRIPTION OF DRAWINGS

The drawings are provided for a further understanding of the embodiments of the present disclosure, and constitute a part of the description. The drawings and the embodiments of the present disclosure are used to illustrate the present disclosure, and are not intended to limit the present disclosure. The above and other features and advantages will become more apparent to those having ordinary skills in the art by describing detailed embodiments with reference to the accompanying drawings, in which.

DETAILED DESCRIPTION

Figure 1:
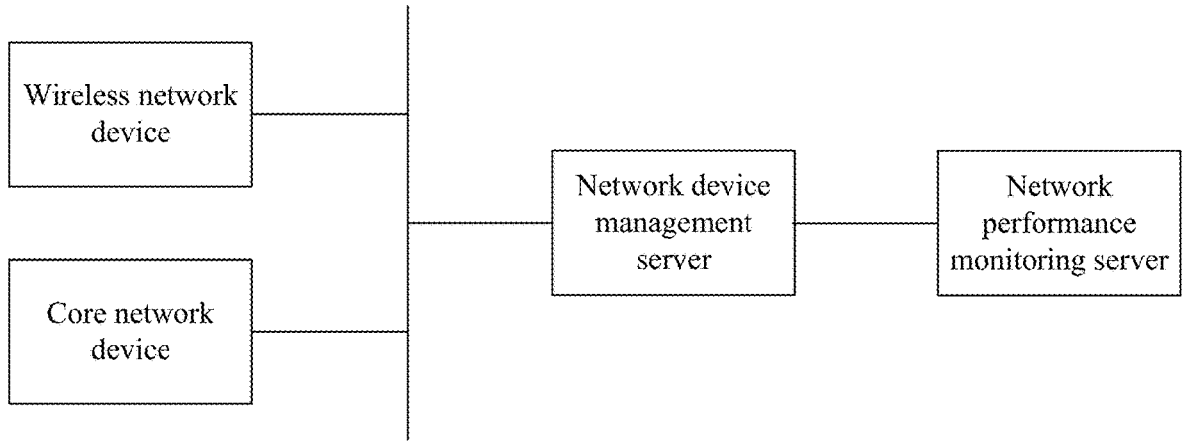
FIG. 1 is a schematic structural block diagram of a mobile communication network to which embodiments of the present disclosure are applicable.

In order for those having ordinary skills in the art to better understand the technical schemes of the embodiments of the present disclosure, a method for identifying a problem cell, an electronic device, and a non-transitory computer-readable medium provided in the embodiments of the present disclosure are described in detail below with reference to the accompanying drawings.

Embodiments of the present disclosure are described more fully below with reference to the accompanying drawings, but the embodiments shown may be embodied in different forms and should not be construed as limited to the embodiments set forth in the present disclosure. Rather, these embodiments are provided to make the present disclosure be thorough and complete, and fully convey the scope of the present disclosure to those having ordinary skills in the art.

The embodiments of the present disclosure may be described with reference to plan views and/or cross-sectional views with the aid of ideal schematic diagrams of the present disclosure. Therefore, example drawings may be modified according to manufacturing techniques and/or tolerances.

The embodiments of the present disclosure and the features in the embodiments may be combined with each other without conflict.

The terminology used in the present disclosure is used to describe particular embodiments only and is not intended to limit the present disclosure. As used in the present disclosure, the term "and/or" includes any and all combinations of one or more of associated items listed. As used in the present disclosure, the singular forms "a", "an", and "the" are intended to include the plural forms as well, unless the context clearly dictates otherwise. As used in the present disclosure, the terms "include", "comprise", and/or "made of" as well as their variants mean that the stated features, integers, steps, operations, elements, and/or components are present, but do not exclude the presence or addition of one or more other features, integers, steps, operations, elements, components, and/or groups thereof.

Unless otherwise defined, the meanings of all the terms (including technical and scientific terms) used in the present disclosure are intended to be the same as those commonly understood by those having ordinary skills in the art. It will also be understood that the terms such as those defined in common dictionaries should be construed as having meanings consistent with their meanings in the context of the related art and the present disclosure, and should not be construed as having idealized or over-formal meanings, unless otherwise expressly defined in the present disclosure.

The embodiments of the present disclosure are not limited to the embodiments shown in the drawings, but include modifications of configurations formed based on manufacturing processes. Therefore, the regions illustrated in the figures have schematic properties and the shapes of regions illustrated in the figures are illustrative of the specific shapes of regions of elements and are not intended to be limiting.

Definitions of Terms

In the embodiments of the present disclosure, unless otherwise specified, the following technical terms should be interpreted as follows:

Mobile communication network: It refers to a network that implements communication between a mobile user and a fixed user or between mobile users. The mobile communication network may be a Global Network for Mobile Communications (GSM) network, a Universal Mobile Communication Network (UMTS) network, a Long-Term Evolution (LTE) network, a Code Division Multiple Access (CDMA) network, a New Radio (NR) network, or the like.

Cell: It refers to the smallest region in a mobile communication network that can be independently controlled. For example, a cell may be a region covered by a base station, or a region covered by an antenna in a base station, or the like.

Subnet: It refers to a region formed by integration of multiple cells for centralized management, and may include multiple cells corresponding to one network element device.

Key performance indicator: It is a parameter obtained according to parameter statistics in the mobile communication network that can represent the performance of the mobile communication network. For example, the key performance indicator may include a connection rate, call drop rate, congestion rate, handover success rate, traffic, bit rate, and the like.

Parameter statistic: It is a direct statistical value of a parameter generated during the operation of the mobile communication network, but does not include a further value (e.g., a ratio-type key performance indicator) calculated according to the direct statistical value. For example, the parameter statistic may include traffic, bit rate, number of successful connections, number of attempted connections, number of dropped calls, number of calls, number of congestions, number of data transmissions, number of successful handovers, number of attempted handovers, and the like.

Application Environment

The embodiments of the present disclosure are applied in a mobile communication network environment.

For example, referring to FIG. 1, a mobile communication network to which the embodiments of the present disclosure are applicable may include: a wireless network device, a core network device, a network device management server, a network performance monitoring server, and the like.

Specific operations in the embodiments of the present disclosure may be implemented by a network performance monitoring server. The network performance monitoring server may periodically acquire data related to key performance indicators of a subnet and cells from a network device management server, so as to implement the embodiments of the present disclosure.

Embodiments of the Present Disclosure

In a mobile communication network (e.g., a mobile broadband network (MBB)), the management is mainly performed on a per-subnet basis. Each subnet is further divided into multiple cells. Therefore, the Key Performance Indicator (KPI) such as the connection rate, call drop rate, congestion rate, handover success rate, traffic, and bit rate in each subnet are actually a combination of the key performance indicators of all the cells in the subnet.

When a certain key performance indicator of the subnet exceeds a predetermined range, it indicates that the key performance indicator is obviously unreasonable, that is, an anomaly occurs in the subnet, seriously affecting the user experience. The anomaly of the subnet is generally caused by a problem of one or more cells. Such cells are called problem cells, or are called top N poorest cells, which are generally cells with poor key performance indicators.

Therefore, it is very important to accurately locate an anomalous problem cell to optimize the network and improve the user experience.

In some related technologies, problem cells are directly determined by ranking the key performance indicators. For example, a cell with a high call drop rate may be directly determined as a problem cell. However, because the traffic volume (e.g., call volume) varies greatly among different cells and the key performance indicators of cells with low traffic volume fluctuate widely, the key performance indicator alone cannot reflect the real performance of the cell, and it is possible that a cell that actually causes the anomaly of the subnet cannot be identified based only on the key performance indicators of the cells.

In another related technology, the key performance indicator and a manually set absolute number of times are used as conditions for screening out problem cells. For example, taking the call drop rate as an example, working personnel (e.g., an on-site network optimization engineer or a customer) manually set thresholds according to geographic environments of cells and problems of the cells that are frequently complained about, i.e., it is specified that a cell is a problem cell only when the number of dropped calls in the cell is greater than a corresponding threshold and the call drop rate of the cell is greater than a corresponding threshold. However, this method involves people's subjective judgments and largely depends upon the human factor, and therefore cannot ensure the accuracy, and is time-consuming and not highly applicable.

Figure 3:
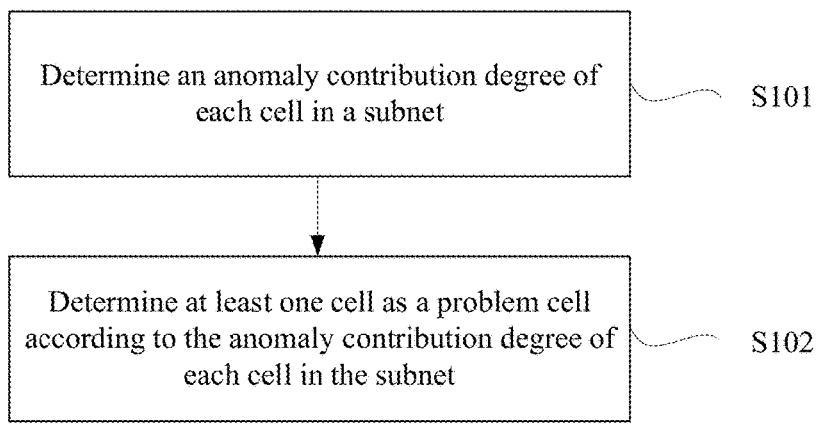
FIG. 3 is a flowchart of a method for identifying a problem cell according to an embodiment of the present disclosure.

In accordance with an aspect of the present disclosure, referring to FIG. 3, an embodiment provides a method for identifying a problem cell. The method includes the following steps S101 to S102.

At S101, an anomaly contribution degree of each cell in a subnet is determined.

The anomaly contribution degree of each cell is, when an anomaly occurs in a key performance indicator of the subnet, a degree of correlation between a key performance indicator of the cell and the anomaly. The key performance indicator of the subnet being anomalous means that the key performance indicator of the subnet exceeds a first threshold range. The key performance indicator of the subnet is determined according to parameter statistics of the cells in the subnet. The key performance indicator of the cell is determined according to parameter statistics in the cell.

When an anomaly occurs in a certain key performance indicator of the subnet (that is, an overall key performance indicator of the subnet exceeds the first threshold range), the anomaly contribution degree of each cell may be determined according to the key performance indicator of the subnet and the key performance indicator of each cell at this time. The anomaly contribution degree of each cell is a degree of correlation between the key performance indicator of the cell and the anomaly in the subnet, or is a possibility of the cell in the subnet causing the anomaly.

Of course, it should be understood that the first threshold range varies with different key performance indicators, that is, each performance indicator should have its own corresponding first threshold range.

At S102, at least one cell is determined as a problem cell according to the anomaly contribution degree of each cell in the subnet.

According to the possibility (anomaly contribution degree) of each cell in the subnet causing the anomaly, a problem cell(s), i.e., the cell(s) that actually cause the anomaly, can be determined.

Of course, it should be understood that the calculation in the method of the embodiments of the present disclosure is performed when the anomaly occurs in the subnet, and therefore may be calculation performed in real time when the anomaly occurs in the subnet, but it does not mean that the method of the embodiments of the present disclosure needs to be performed in real time. For example, relevant data when the anomaly occurs in the subnet may be saved, and then processed in a centralized manner in accordance with the method of the embodiments of the present disclosure.

In the embodiments of the present disclosure, according to the key performance indicators of the subnet and the cells (or the parameter statistics of all the cells) when the anomaly occurs, the anomaly contribution degree of each cell in the subnet, i.e., the possibility of each cell in the subnet causing the anomaly, is determined. Therefore, compared to the related technologies in which the anomaly contribution degrees of the cells are determined based only on the key performance indicators of the cells in the subnet, the method of the embodiments of the present disclosure can more accurately determine the problem cell(s) (i.e., the cell(s) that actually cause the anomaly) according to the anomaly contribution degrees, thereby facilitating follow-up targeted network optimization and improving user experience.

In addition, the embodiments of the present disclosure may be implemented in an automated manner without manual intervention, are not affected by the human factor, and are fast, intelligent and accurate.

In some embodiments, the first threshold range includes: a lower limit of the first threshold range and/or an upper limit of first threshold range.

The first threshold range for determining whether an anomaly occurs in the subnet may include an upper limit value and a lower limit value, i.e., either a too large key performance indicator or a too small key performance indicator may be determined as abnormal. For example, when the bit rate is too large or too small, it may represent that the bit rate is abnormal.

In some embodiments, the first threshold range may include only one of the upper limit value and the lower limit value, i.e., only one of a too large key performance indicator and a too small key performance indicator can be determined as abnormal. For example, when the call drop rate is greater than a certain value, the call drop rate is abnormal, but even if the drop rate is a minimum value of 0, the call drop rate should not be determined as abnormal.

In some embodiments, the first threshold range is determined by a dynamic threshold detection technique.

That is to say, the first threshold range may be a real-time value calculated according to the dynamic threshold detection technique (e.g., a self-learning Holt-Winters algorithm).

Figure 2:
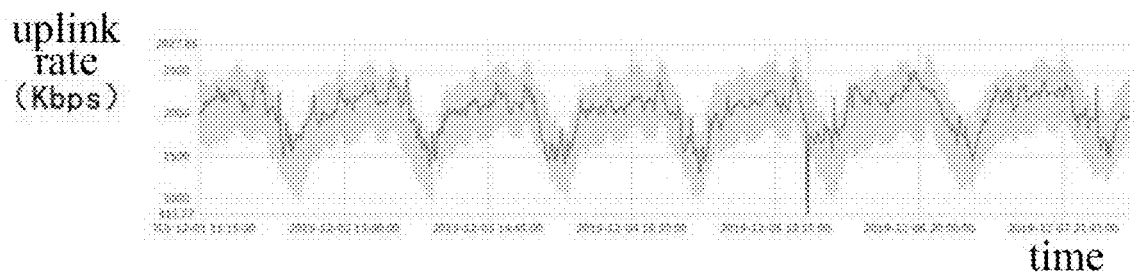
FIG. 2 is a schematic diagram showing a real-time value of an uplink rate as a key performance indicator and a first threshold range according to an embodiment of the present disclosure.

For example, referring to FIG. 2, a dark line represents a real-time value of an uplink rate as a key performance indicator, and light-colored regions on upper and lower sides of the dark line represent a value range of the first threshold range at each time. It can be seen that the first threshold range changes in real time.

The process of determining a normal range (the first threshold range) of the key performance indicator by the dynamic threshold detection technique may be implemented according to some related technologies, which will not be described in detail herein.

As an implementation of the embodiments of the present disclosure, the following introduces a specific manner of determining problem cells when an anomaly occurs in a ratio-type key performance indicator.

The ratio-type key performance indicator is a ratio of two different parameter statistics, such as a percentage. The ratio-type key performance indicator is a ratio of a first parameter statistic to a second parameter statistic.

For example, the ratio-type key performance indicator may include a connection rate, call drop rate, congestion rate, handover success rate, and the like. Correspondingly, the first parameter statistics corresponding to the connection rate, the call drop rate, the congestion rate, and the handover success rate are respectively a number of successful connections, a number of dropped calls, a number of congestions, and a number of successful handovers. The second parameter statistics corresponding to the connection rate, the call drop rate, the congestion rate, and the handover success rate are respectively a number of attempted connections, a number of calls, a number of data transmissions, and a number of times of attempted handovers.

Therefore, a key performance indicator (ratio-type key performance indicator) of an $i^{th}$ cell may be calculated by the following formula:

key performance indicator of the $i^{th}$ cell=first parameter statistic of the $i^{th}$ cell/second parameter statistics of the $i^{th}$ cell.

Correspondingly, the key performance indicator (ratio-type key performance indicator) of each subnet is equal to a ratio of the first parameter statistics to the second parameter statistics of all the cells, i.e., $$\text{key performance indicator of the subnet} = \left(\sum_{i=1}^{n} \text{first parameter statistic of the } i^{th} \text{ cell}\right) \Big/ \left(\sum_{i=1}^{n} \text{second parameter statistic of the } i^{th} \text{ cell}\right),$$

where n is a total number of cells in the subnet.

It can be seen that, for the ratio-type key performance indicator, the key performance indicator of the subnet is not a sum of the key performance indicators of the cells in the subnet.

In some embodiments, for the ratio-type key performance indicator, the anomaly contribution degree of each of the cells indicates a degree to which the key performance indicator of the subnet after removal of the cell from the subnet is shifted toward the first threshold range relative to the key performance indicator of the subnet before the removal of the cell from the subnet.

After the cell is removed from the subnet, a new key performance indicator of the subnet may be obtained for the remaining cells in the subnet. A degree to which the new key performance indicator of the subnet is shifted toward the first threshold range relative to an original key performance indicator of the subnet before the removal of the cell from the subnet is the anomaly contribution degree of the cell.

"The degree to which the new key performance indicator of the subnet is shifted toward the first threshold range" means that if the new key performance indicator after the removal is closer to the first threshold range than the original key performance indicator before the removal, the degree of shifting is positive (i.e., shifting toward the first threshold range); on the contrary, if the new key performance indicator after the removal is further away from the first threshold range than the original key performance indicator before the removal, the degree of shifting is negative (i.e., shifting away from the first threshold range).

Because the subnet is currently in an abnormal state, the current key performance indicator of the subnet inevitably exceeds the first threshold range. Therefore, when the new key performance indicator after the removal is closer to the first threshold range than the original key performance indicator before the removal, it means that the degree by which the new key performance indicator after the removal is shifted toward the first threshold range relative to the original key performance indicator is a "positive value". That is, after a cell is removed, the key performance indicator becomes closer to the first threshold range or even falls within the first threshold range (that is, is shifted toward normal), so the role of the "removed" cell is to make the key performance indicator away from the first threshold range. Therefore, in this case, the anomaly contribution degree of the cell is "positive contribution", or in other words, the role of the cell is to cause an anomaly in the subnet.

On the contrary, when the new key performance indicator after the removal is further away from the first threshold range than the original key performance indicator before the removal, it means that the degree to which the new key performance indicator after the removal is shifted toward the first threshold range relative to the original key performance indicator is a "negative value". That is, after a cell is removed, the key performance indicator becomes further away from the first threshold range (that is, is shifted toward abnormal), so the role of the "removed" cell should be to make the key performance indicator close to the first threshold range. Therefore, in this case, the anomaly contribution degree of the cell is "negative contribution", or in other words, the role of the cell is to prevent occurrence of anomalies in the subnet.

Of course, the new key performance indicator after the removal may also be equal to the original key performance indicator, and in this case, the anomaly contribution degree of the cell is 0, i.e., the cell has no impact on the anomaly that occurs in the subnet.

Specifically, in this case, an anomaly contribution degree of a $j^{th}$ cell may be calculated by the following formula:

$$\text{anomaly contribution degree of the } j^{th} \text{ cell} = D^* [\text{key performance indicator of the subnet} - \left(\sum_{i=1}^{n} \text{first parameter statistic of the } i^{th} \text{ cell} - \text{first parameter statistic of the } j^{th} \text{ cell}\right) \Big/ \left(\sum_{i=1}^{n} \text{second parameter statistic of the } i^{th} \text{ cell} - \text{second parametric statistic of the } j^{th} \text{ cell}\right)],$$

where n is a total number of cells in the subnet; D is an abnormal direction, which is defined as:

when the key performance indicator of the subnet is greater than the upper limit of the first threshold range, D=1;

when the key performance indicator of the subnet is less than the lower limit of the first threshold range, D=−1.

Of course, it should be understood that when the first threshold range has only one of the upper limit and the lower limit, the key performance indicator can exceed the first threshold range from only one direction, so the abnormal direction may be a constant value.

In addition, an absolute value of the abnormal direction is not limited to 1, and any positive and negative values having the same absolute value may be used.

It can be seen that according to the above algorithm, when an anomaly occurs in the ratio-type key performance indicator, the anomaly contribution degree of the cell is not calculated based only on the key performance indicator and parameter statistic (e.g., the number of times) of the cell, but is calculated according to the first parameter statistic and the second parameter statistic of the cell and the first parameter statistics and the second parameter statistics of the other cells in the subnet. Therefore, the anomaly contribution degree can reflect the actual correlation degree between the cell and the abnormal subnet, and the problem cells can be determined more accurately according to the anomaly contribution degree, thereby achieving better network optimization and improving user experience.

Figure 4:
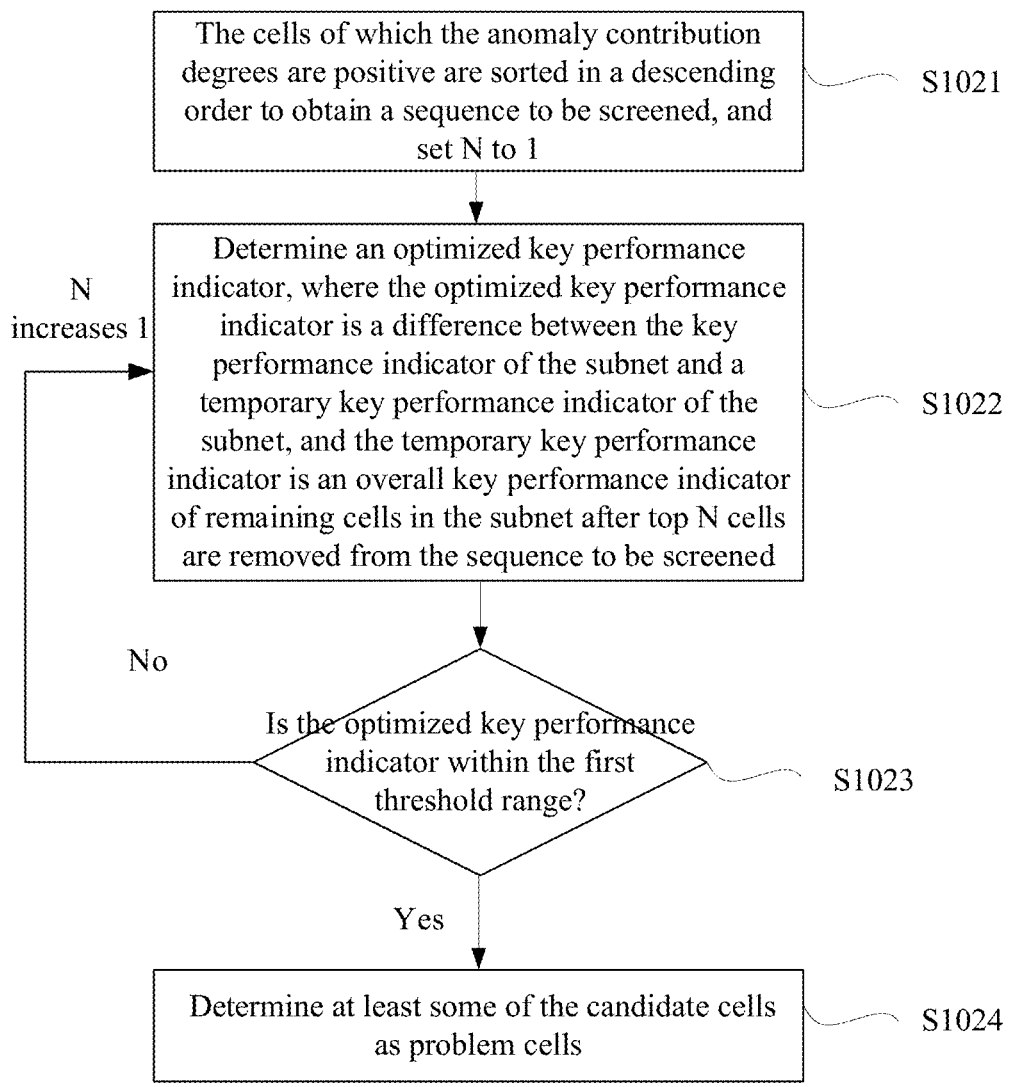
FIG. 4 is a flowchart of some steps in another method for identifying a problem cell according to an embodiment of the present disclosure.

Referring to FIG. 4, in some embodiments, the S102 of determining at least one cell as a problem cell according to the anomaly contribution degree of each cell in the subnet includes the following steps S1021 to S1024.

At S1021, the cells of which the anomaly contribution degrees are positive are sorted in a descending order to obtain a sequence to be screened, and N is set to 1.

At S1022, an optimized key performance indicator is determined, where the optimized key performance indicator is a difference between the key performance indicator of the subnet and a temporary key performance indicator of the subnet, and the temporary key performance indicator is an overall key performance indicator of remaining cells in the subnet after top N cells are removed from the sequence to be screened.

At S1023, the top N cells in the sequence to be screened are determined as candidate cells if the optimized key performance indicator is within the first threshold range; or N is increased by 1 and the process returns to the step of determining the optimized key performance indicator if the optimized key performance indicator exceeds the first threshold range.

At S1024, at least some of the candidate cells are determined as problem cells.

After the anomaly contribution degree of each cell in the subnet is determined, it is necessary to further determine problem cells. However, the anomaly contribution degree is a relative value. Although the anomaly contribution degree can indicate the degree of correlation between each cell in the subnet and the anomaly, the number of cells to be selected as problem cells cannot be directly determined according to the value of the anomaly contribution degree. In view of this, the cells of which the anomaly contribution degrees are positive may be selected to form a sequence to be screened. Because only the cells of which the anomaly contribution degrees are positive may cause an anomaly, and the role of other cells is to eliminate or have no impact on the anomaly, so only the cells of which the anomaly contribution degrees are positive may be problem cells.

Then, cells are removed in a descending order of the anomaly contribution degrees. The number of cells removed gradually increases. To be specific, in a first time of removal, the cell with the largest anomaly contribution degree is removed (N=1); in a second time of removal, the cells corresponding to the first two highest anomaly contribution degrees are removed (N=2); in a third time of removal, the cells corresponding to the first three highest anomaly contribution degrees are removed (N=3); and so on.

Each time after a cell(s) is/are removed, a temporary key performance indicator of the subnet is calculated. The temporary key performance indicator is a key performance indicator of a "small subnet" formed by the remaining cells in the subnet after the cell(s) is/are removed.

Then, the difference between the key performance indicator of the subnet and the temporary key performance indicator of the subnet, i.e., the difference between the key performance indicator of the "original subnet" (the overall key performance indicator of all the cells) and the current key performance indicator of the "small subnet" formed by the remaining cells after a current number of cells removed according to the current number (that is, the overall key performance indicator of the remaining cells after the N cells with the largest anomaly contribution degrees are removed), is calculated as the optimized key performance indicator.

For example, when N cells are removed, the optimized key performance indicator may be calculated by the following formula:

$$\text{optimized key performance indicator when } N \text{ cells are removed} =$$
$$\text{key performance indicator of the subnet} -$$
$$\left( \sum_{i=1}^{n} \text{first parameter statistic of the } i^{th} \text{ cell} \sum_{j=1}^{N} \text{first parameter statistic of the } j^{th} \text{ cell} \right) \Big/$$
$$\left( \sum_{i=1}^{n} \text{second parameter statistic of the } i^{th} \text{ cell} - \sum_{j=1}^{N} \text{second parametric statistic of the } j^{th} \text{ cell} \right),$$

where n is a total number of cells in the subnet, and N is the current number of cells removed.

After any removal, processing is carried out in the following cases:

(1) If the optimized key performance indicator is not within the first threshold range, one more cell is removed (N=N+1), and the process returns to the step (S1022) of determining the optimized key performance indicator to recalculate the optimized key performance indicator;

(2) If the optimized key performance indicator is within the first threshold range, the removal process ends, and the currently removed N cells (that is, the N cells with the largest anomaly contribution degrees) are determined as "candidate cells", and at least some of the candidate cells are determined as problem cells (S1024).

It should be understood that anomalies can actually be caused by only cells of which the anomaly contribution degrees are positive, so after a subnet removes all the cells of which the anomaly contribution degrees are positive (that is, all cells in the sequence to be screened), the optimized key performance indicator is surely within the first threshold range, i.e., the candidate cells are at most all the cells in the sequence to be screened.

Figure 5:
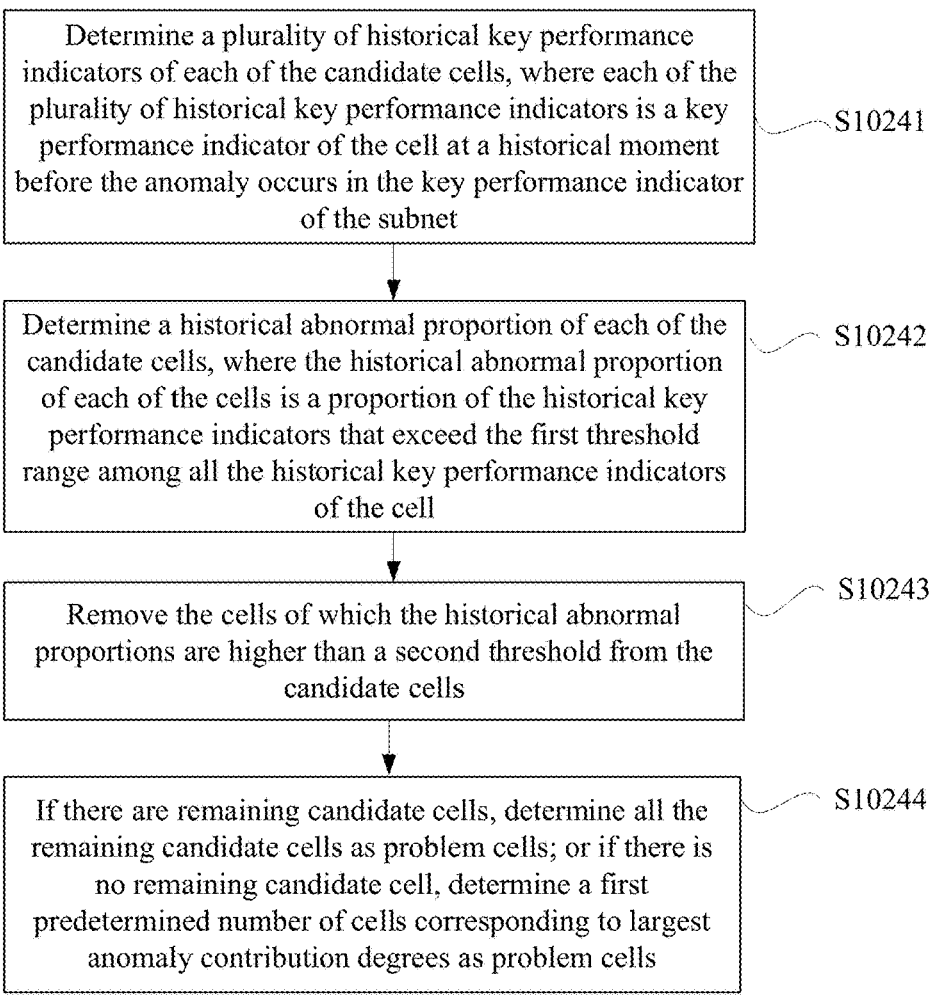
FIG. 5 is a flowchart of some steps in another method for identifying a problem cell according to an embodiment of the present disclosure.

In some embodiments, referring to FIG. 5, the step S1024 of determining at least some of the candidate cells as problem cells includes the following steps S10241 to S10243.

At S10241, a plurality of historical key performance indicators of each of the candidate cells are determined, where each of the plurality of historical key performance indicators is a key performance indicator of the cell at a historical moment before the key performance indicator of the subnet is abnormal.

At S10242, a historical abnormal proportion of each of the candidate cells is determined, where the historical abnormal proportion of each of the cells is a proportion of the historical key performance indicators that exceed the first threshold range among all the historical key performance indicators of the cell.

At S10243, the cells of which the historical abnormal proportion is higher than a second threshold are removed from the candidate cells.

From the perspective of the anomaly contribution degree only, the candidate cells determined above are the problem cells causing the anomaly, but the historical state has not been taken into consideration for the candidate cells.

For example, the key performance indicators of some cells may be in a poor state for a long time (for example, the key performance indicators often exceed the first threshold range), and such cells are called "cells with poor indicator quality". A cell with poor indicator quality generally has a high anomaly contribution degree, and is likely to be determined as a candidate cell.

Although the key performance indicators of the cells with poor indicators are poor for a long time, no anomaly occurs in the subnet. This indicates that the anomaly in this case may not be caused by the cells with poor indicator quality, but may be caused by a sudden "deterioration" of the key performance indicators of other cells. That is to say, the problem cells that are finally determined actually should not include the cells with poor indicator quality.

In view of this, for each candidate cell, key performance indicators (historical key performance indicators) at multiple historical moments before the anomaly occurs in the subnet (where the multiple historical moments may all be within a predetermined time range before the anomaly occurs) may be collected. For example, if historical key performance indicators are collected every 15 minutes in the 5 hours before the anomaly, a total of 20 historical key performance indicators of 20 historical moments are obtained.

Then, a determination is made as to whether each historical key performance indicator exceeds the first threshold range, i.e., a determination is made as to whether the key performance indicator of the cell is poor at each historical moment. The first threshold range may be a fixed value. If the first threshold range is the above real-time value, each historical key performance indicator may be compared with the first threshold range at the corresponding historical moment.

In some embodiments, a proportion of the historical key performance indicators that exceed the first threshold range among all the historical key performance indicators of each candidate cell, i.e., the historical abnormal proportion, is further determined. For example, if a cell has 20 historical key performance indicators, 18 of which exceed the first threshold range, the historical abnormal proportion of the cell=18/20=90%.

Obviously, the larger the historical abnormal proportion of a certain cell, the worse the overall key performance indicator of the cell in the past, and the more likely of a cell with poor indicator quality. Therefore, the historical abnormal proportion of each candidate cell may be compared with the preset second threshold (e.g., 80%). If a certain cell has a historical abnormal proportion (e.g., 90%) greater than the second threshold (e.g., 80%), a determination is made that the key performance indicator of this candidate cell is poor for a long time and the candidate cell is a cell with poor indicator quality and may be removed from the candidate cells.

In this manner, the cells having a poor key performance indicator for a long time are filtered out, and the remaining candidate cells should be the problem cells that actually cause the anomaly, such that the problem cells can be obtained more accurately.

In some embodiments, after S10243 of removing the cells of which the historical abnormal proportions are higher than a second threshold from the candidate cells, the method further includes a following step S10244.

At S10244, if there are remaining candidate cells, all the remaining candidate cells are determined as problem cells; or if there is no remaining candidate cell, a first predetermined number of cells corresponding to largest anomaly contribution degrees are determined as problem cells.

If there is at least one candidate cell left (that is, not filtered out) after the cells with poor indicator quality are removed, the remaining candidate cells may be directly determined as problem cells.

However, if there are no candidate cell left after the cells with poor indicator quality are removed, it means that the above filtering process is unreasonable, and a specific number of cells (that is, the first predetermined number of cells) corresponding to the largest anomaly contribution degrees should be directly selected from all the cells (which, of course, are all the cells before filtering) as problem cells. For example, three cells corresponding to the largest anomaly contribution degrees are selected as problem cells (that is, the first predetermined number is 3).

For example, a specific example where problem cells are determined for an anomaly in a ratio-type key performance indicator is described below.

Assuming that an anomaly occurs in a key performance indicator "cell availability" of a subnet 370801 of an LTE network at 2019-12-05 02:15, that is, the cell availability is lower than the lower limit of the first threshold range, as shown in the following table:

| Subnet identifier | Abnormal moment | Type of key performance indicator | First threshold range upper limit | First threshold range lower limit | Current key performance indicator | Abnormal direction |
|---|---|---|---|---|---|---|
| 370801 | 2019-12-05 02:15 | Cell availability | 0.978196 | 0.957941 | 0.85056 | −1 |

The cell availability rate is equal to a ratio of an actual available duration in a statistical period to a total duration of the statistical period. When the anomaly occurs, the actual available duration is 614700 s, and the duration of the statistical period is 722700 s. Therefore, it may be obtained that the cell availability in this case is 0.85056, which is lower than the lower limit of the first threshold range.

Correspondingly, the actual available duration and the total duration of the statistical period of each cell in the subnet are obtained, and the anomaly contribution degree of each cell is calculated. Taking a cell (210517, 210517, 12) as an example, assuming that the actual available duration of the cell is 0 s and the duration of the statistical period is 900 s, it may be obtained that:

$$\text{anomaly contribution degree of cell}(210517, 210517, 12) = -1*[614700/722700 - (614700-0)/(722700-900)] = 0.106055*10^{-2}.$$

The cells of which the anomaly contribution degrees are greater than 0 are retained and sorted in a descending order to obtain a sequence to be screened as follows:

| Cell identifier | | | Actual available time (s) | Statistical period duration (s) | Anomaly contribution degree (10-2) |
|---|---|---|---|---|---|
| Management element | Base station | Cell number | | | |
| 210517 | 210517 | 12 | 0 | 900 | 0.106055 |
| 210611 | 210611 | 11 | 0 | 900 | 0.106055 |
| 415999 | 415999 | 131 | 0 | 900 | 0.106055 |
| 415998 | 415998 | 136 | 0 | 900 | 0.106055 |

In the above manner, starting from N=1, the cells are removed. Some of the optimized key performance indicators obtained after removing different numbers of cells are as follows:

$$\ldots,0.903225,0.904352,0.90548,\ldots,0.956639, 0.957359,0.958079.$$

After 66 cells are removed, the optimized key performance indicator of 0.958079 becomes greater than the lower limit of the first threshold range of 0.957941, so a total of 66 candidate cells may be obtained.

Among the 66 candidate cells, the cell availabilities of some cells are always 0, so the anomaly contribution degree alone cannot reflect the contribution of these cells to the anomaly.

Therefore, it is necessary to filter out cells with poor indicator quality, determine whether a proportion of the cell availabilities of each cell that are not within the first threshold range among all the cell availabilities within a period of time before the abnormal moment exceeds the second threshold (e.g., 80%), and if yes, remove the cell from the candidate cells.

Therefore, the final remaining candidate cells may be determined as the problem cells.

Moreover, these problem cells are basically not cells with poor cell availability for a long time, but are mostly cells of which the cell availability suddenly deteriorates significantly when the anomaly occurs in the subnet or in a relatively short period of time before the anomaly occurs in the subnet, i.e., cells that cause the current cell availability of the subnet to be lower than the lower limit of the first threshold range (i.e., that cause the current anomaly).

As another implementation of the embodiments of the present disclosure, the following introduces a specific manner of determining problem cells when an anomaly occurs in a numerical key performance indicator.

Numerical key performance indicators are directly parameter statistics, and are not calculated by parameter statistics.

For example, the numerical key performance indicator may include bit rate and traffic, and the corresponding parameter statistics are bit rate and traffic.

Of course, the first parameter statistic and the second parameter statistic used to calculate the ratio-type key performance indicator may also be regarded as numerical key performance indicators, for example, the number of successful connections, the number of attempted connections, the number of dropped calls, the number of calls, the number of congestions, the number of data transmissions, the number of successful handovers, the number of attempted handovers, and the like.

Therefore, in this case, the key performance indicator of the subnet is directly equal to the sum of the key performance indicators of all the cells in the subnet.

In some embodiments, for the numerical key performance indicator, the anomaly contribution degree of each of the cells is determined according to a ratio of a key performance indicator deviation value of the cell to a key performance indicator deviation value of the subnet.

The key performance indicator deviation value of each of the cells is a difference between the key performance indicator of the cell and a predicted key performance indicator of the cell. The key performance indicator deviation value of the subnet is a difference between the key performance indicator of the subnet and a predicted key performance indicator of the subnet. The predicted key performance indicator of each of the cells is a predicted normal value of the key performance indicator of the cell. The predicted key performance indicator of the subnet is a sum of the predicted key performance indicators of the cells in the subnet.

That is to say, when the key performance indicator is a numerical key performance indicator, the anomaly contribution degree of each cell may be calculated in the following manner:

A predicted key performance indicator is set for each cell, where the predicted key performance indicator is a predicted "normal value" of the key performance indicator of the cell. Correspondingly, the sum of the predicted key performance indicators of all the cells in the subnet is the predicted key performance indicator of the subnet, that is, the predicted "normal value" of the key performance indicator of the subnet.

Obviously, when an anomaly occurs in the subnet, the key performance indicator of the subnet inevitably deviates from the predicted key performance indicator of the subnet (i.e., deviates from the normal value). At the same time, the predicted key performance indicators of at least some of the cells in the subnet also deviate from the predicted key performance indicators of these cells. That is to say, the deviation of the key performance indicator of the subnet from the normal value is surely caused by the deviation of the key performance indicators of the cells from the respective normal values of the cells.

Therefore, the key performance indicator deviation value of the cell, i.e., the degree to which the key performance indicator of the cell deviates from the normal value, can be obtained according to the difference between the key performance indicator and the predicted key performance indicator of the cell. The key performance indicator deviation value of the subnet, i.e., the degree to which the key performance indicator of the subnet deviates from the normal value can be obtained according to the difference between the key performance indicator and the predicted key performance indicator of the subnet.

The ratio of the key performance indicator deviation value of the cell to the key performance indicator deviation value of the subnet represents a proportion that the key performance indicator deviation of the cell accounts for in the key performance indicator deviation of the subnet, or in other words, represents the degree to which the key performance indicator deviation (i.e., anomaly) of the subnet is caused by the cell, i.e., the anomaly contribution degree of the cell.

In some embodiments, an anomaly contribution degree of an $i^{th}$ cell may be calculated by the following formula:

anomaly contribution degree of the $i^{th}$ cell=(key performance indicator of the $i^{th}$ cell−predicted key performance indicator of the $i^{th}$ cell)/(key performance indicator of the subnet−predicted key performance indicator of the subnet).

Of course, it should be understood that since the key performance indicators of the cells and the subnet may deviate from respective predicted key performance indicators (normal values) in different directions (may be large or small), the anomaly contribution degree calculated above may also be positive, negative, or 0.

Correspondingly, if the anomaly contribution degree of the cell is positive, it indicates that the cell has a "positive contribution" to the anomaly, or in other words, the role of the cell is to cause an anomaly in the subnet.

If the anomaly contribution of the cell is negative, it indicates that the cell has a "negative contribution" to the anomaly, or in other words, the role of the cell is to prevent the occurrence of anomalies in the subnet.

If the anomaly contribution degree of the cell is 0, it indicates that the cell has no impact on the anomaly that occurs in the subnet.

In some embodiments, the predicted key performance indicator of each of the cells is an average value of key performance indicators of the cell within a predetermined time period before the anomaly occurs in the key performance indicator of the subnet.

That is to say, the average value of the key performance indicators of the cell within a period of time before the anomaly occurs in the subnet may be used as the predicted key performance indicator of the cell. For example, an average value of the key performance indicators of the cell obtained in the same time period as that in which the anomaly occurs every day within 15 days before the anomaly occurs may be used as the predicted key performance indicator of the cell.

Correspondingly, the predicted key performance indicator of the subnet is actually the average value of the key performance indicators of the subnet within the above time period.

Of course, it should be understood that it is also possible to determine the predicted key performance indicator of each cell in the subnet by manual setting based on experience.

Figure 6:
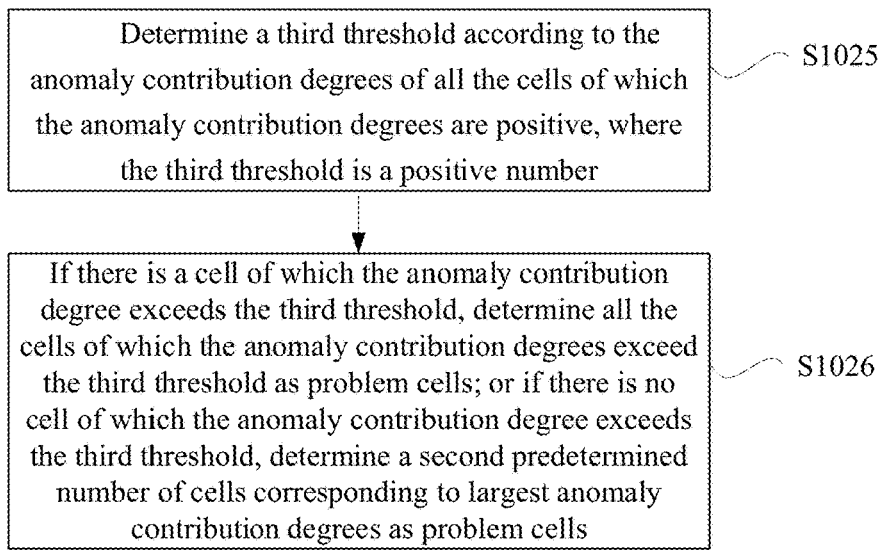
FIG. 6 is a flowchart of some steps in another method for identifying a problem cell according to an embodiment of the present disclosure.

In some embodiments, referring to FIG. 6, the step S102 of determining at least one cell as a problem cell according to the anomaly contribution degree of each cell in the subnet includes the following steps S1025 to S1026.

At S1025, a third threshold is determined according to the anomaly contribution degrees of all the cells of which the anomaly contribution degrees are positive, where the third threshold is a positive number.

At S1026, if there is a cell of which the anomaly contribution degree exceeds the third threshold, all the cells of which the anomaly contribution degrees exceed the third threshold are determined as problem cells; or if there is no cell of which the anomaly contribution degree exceeds the third threshold, a second predetermined number of cells corresponding to largest anomaly contribution degrees are determined as problem cells.

As described above, the anomaly contribution degree of each cell in the subnet is merely a relative value representing the degree of correlation between the cell and the anomaly, and the number of cells to be selected as problem cells cannot be directly determined based only on the anomaly contribution degree of each cell in the subnet.

Therefore, a third threshold may be calculated according to the anomaly contribution degrees of all the cells of which the anomaly contribution degrees are positive (that is, all the cells that may cause the anomaly), and the cells of which the anomaly contribution degrees exceed the third threshold (if any) are determined as the problem cells.

Of course, if it is found that actually there is no cell having an anomaly contribution degree exceeding the third threshold, it may be considered that the anomaly is caused by a universal problem of multiple cells, and a specific number (that is, a second predetermined number) of cells (that is, all cells) corresponding to the largest anomaly contribution degrees are directly determined as problem cells. For example, 10 cells corresponding to the largest anomaly contribution degrees are selected as problem cells (i.e., the second predetermined number is 10).

In some embodiments, the third threshold is calculated by the following formula:

third threshold=an average value of the anomaly contribution degrees of all the cells of which the anomaly contribution degrees are positive+ $k$*standard deviation of the anomaly contribution degrees of all the cells of which the anomaly contribution degrees are positive, where $k$ is a value greater than 0.

As a specific implementation, the average value and standard deviation of the anomaly contribution degrees of all the cells of which the anomaly contribution degrees are positive may be calculated, and a sum of the average value and a certain multiple of the standard deviation may be used as the third threshold.

For example, a cell having an anomaly contribution degree exceeding the sum of the average value and 3 times the standard deviation (i.e., $k=3$) may be defined as a problem cell.

Of course, it should be understood that the above algorithm for the third threshold is merely an example, and different calculation methods may also be used. For example, the third threshold may be equal to the average value of the anomaly contribution degrees of all the cells of which the anomaly contribution degrees are positive.

For example, a specific example where problem cells are determined for an anomaly in a numerical key performance indicator is described below.

Assuming that an anomaly occurs in a numerical key performance indicator of user-plane uplink data volume of a subnet 370400 of an LTE network at 2019-12-09 21:00.

First, the anomaly contribution degree of each cell in the subnet is calculated in the above manner, the positive anomaly contribution degrees are retained and sorted. The results are as follows:

| Cell identifier | | | Anomaly |
| --- | --- | --- | --- |
| Management element | Base station | Cell number | contribution degree |
| 242624 | 242624 | 11 | 0.000818 |
| | | 32 | 0.000406 |
| 242627 | 242627 | 11 | 0.000518 |
| | | 22 | 0.000773 |
| | | 45 | 0.000004 |
| . . . | . . . | . . . | . . . |
| 903581 | 903581 | 31 | 0.000268 |
| 903584 | 903584 | 11 | 0.003178 |
| | | 21 | 0.000389 |
| | | 31 | 0.000404 |
| 903598 | 903598 | 31 | 0.000801 |

Further, the average value and standard deviation of the anomaly contribution degrees of the cells of which the anomaly contribution degrees are positive are determined, so as to determine:

third threshold=average value+3*standard deviation=0.018652.

Therefore, the cells of which the anomaly contribution degrees exceed 0.018652 may be selected as problem cells.

It can be seen that in the embodiments of the present disclosure, when an anomaly occurs in the numerical key performance indicator or the ratio-type key performance indicator, the specific algorithm for determining problem cells varies with the numerical key performance indicator and the ratio-type key performance indicator.

Figure 7:
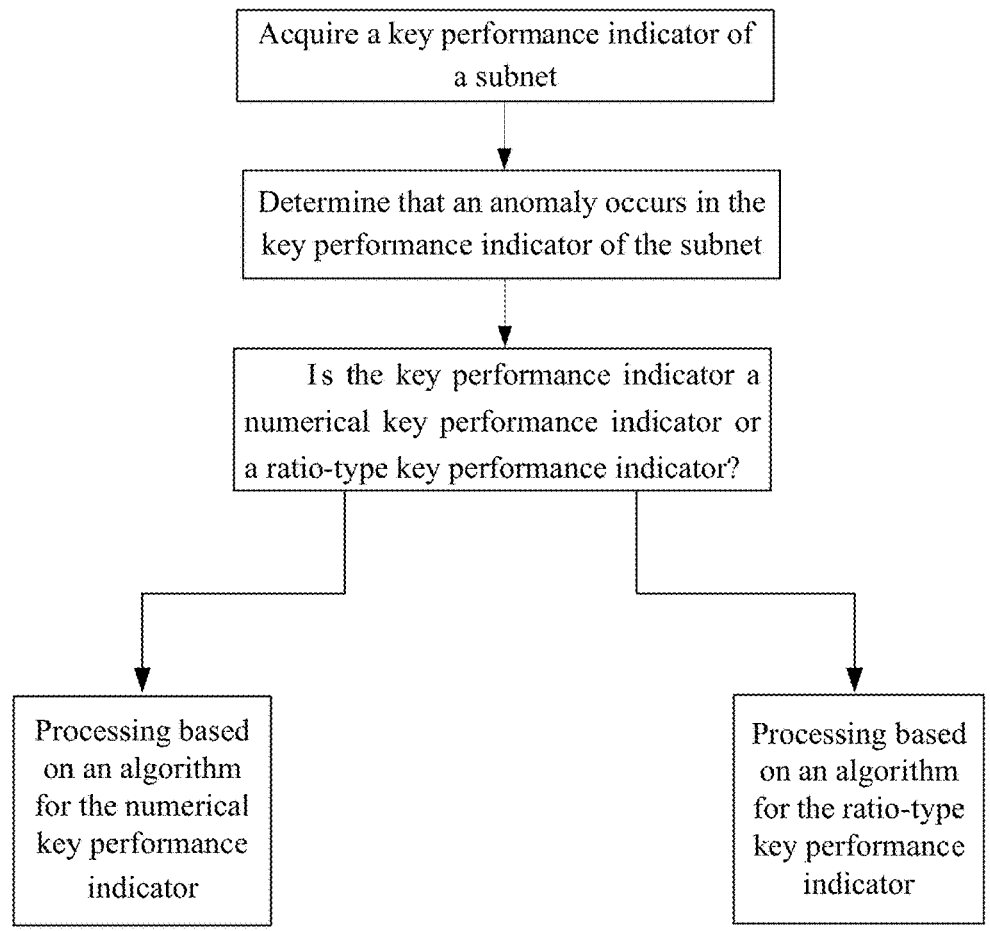
FIG. 7 is a logical process diagram of another method for identifying a problem cell according to an embodiment of the present disclosure.

Therefore, referring to FIG. 7, from a logical point of view, the embodiment of the present disclosure needs to first obtain the key performance indicator of the subnet to determine whether an anomaly occurs in the key performance indicator of the subnet. When an anomaly occurs, it is necessary to first determine whether the key performance indicator exceeding the first threshold range is a numerical key performance indicator or a ratio-type key performance indicator, and then processing the anomaly according to a corresponding method.

The differences between the algorithm corresponding to the numerical key performance indicator and the algorithm corresponding to the ratio-type key performance indicators mainly include:

(1) Different methods for calculation of the anomaly contribution degrees of the cells. This is because the ratio-type key performance indicator of the subnet is not equal to the sum of the ratio-type key performance indicators of the cells in the subnet, and cannot be obtained by calculating the sum of the ratio-type key performance indicators of the cells.

(2) Exclusion of the step of filtering out "cells with poor indicator quality" in the calculation for the anomaly in the numerical key performance indicator. This is because the process of calculating the anomaly contribution degrees for the numerical key performance indicator already takes into consideration the historical key performance indicators (predicted key performance indicators) of the cells, while the process of calculating the anomaly contribution degrees for the ratio-type key performance indicator only takes into consideration the data of each cell when the anomaly occurs. Therefore, when an anomaly occurs in the numerical key performance indicator, it is no longer necessary to additionally filter out cells with poor performance indicators in history (cells with poor indicator quality).

It can be seen that in the embodiments of the present disclosure, different algorithms for determining problem cells are proposed respectively for the numerical key performance indicator and the ratio-type key performance indicator. Each algorithm is especially suitable for corresponding key performance indicators. In this way, problem cells can be obtained accurately for various key performance indicators.

In addition, the embodiments of the present disclosure may be implemented in an automated manner without manual intervention, are not affected by the human factor, and are fast, intelligent and accurate.

Figure 8:
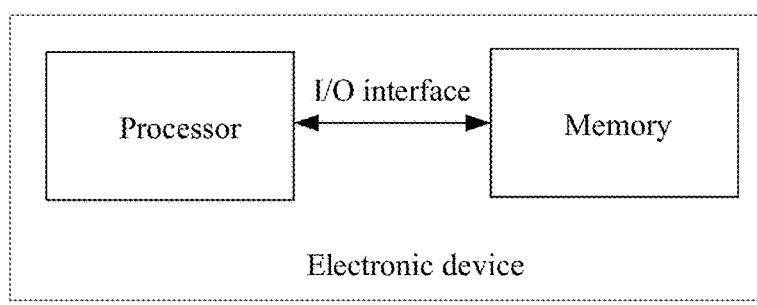
FIG. 8 is a structural block diagram of an electronic device according to an embodiment of the present disclosure.

In accordance with another aspect of the present disclosure, referring to FIG. 8, an embodiment provides an electronic device. The electronic device includes:

one or more processors;

a memory, storing one or more programs which, when executed by the one or more processors, cause the one or more processors to implement any one of the methods for identifying a problem cell; and one or more I/O interfaces, connected between the one or more processors and the memory, and configured to implement information exchange between the one or more processors and the memory.

The processor is a device with a data processing capability, including but not limited to a central processing unit (CPU), etc. The memory is a device with a data storage capability, including but not limited to a random access memory (RAM, more specifically such as a synchronous dynamic random access memory (SDRAM), a double data rate (DDR) SDRAM, etc.), a read-only memory (ROM), an electrically erasable programmable read-only memory (EEPROM), and a flash. The I/O interface (read-write interface) is connected between the processor and the memory, and can implement the information exchange between the memory and the processor, including but not limited to a data bus.

Figure 9:
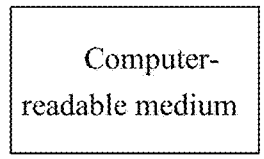
FIG. 9 is a structural block diagram of a computer-readable medium according to an embodiment of the present disclosure.

In accordance with another aspect of the present disclosure, referring to FIG. 9, an embodiment provides a computer-readable medium, storing a computer program which, when executed by a processor, causes the processor to implement the method for identifying a problem cell.

Those having ordinary skills in the art can understand that all or some of the steps in the methods disclosed above and the functional modules/units in the system and the apparatus can be implemented as software, firmware, hardware, and appropriate combinations thereof.

In a hardware implementation, the division of the functional modules/units mentioned in the above description does not necessarily correspond to the division of physical components. For example, one physical component may have multiple functions, or one function or step may be jointly executed by several physical components.

Some or all physical components may be implemented as software executed by a processor, such as a central processing unit (CPU), a digital signal processor, or a microprocessor, or as hardware, or as an integrated circuit, such as an application-specific integrated circuit. Such software may be distributed on a computer-readable medium, which may include a computer storage medium (or non-transitory medium) and a communication medium (or transitory medium). As is known to those having ordinary skill in the art, the term "computer storage medium" includes volatile and nonvolatile, removable and non-removable media implemented in any method or technology for storage of information (such as computer readable instructions, data structures, program modules, or other data). The computer storage medium includes but is not limited to a random access memory (RAM), a read-only memory (ROM), an electrically erasable programmable read-only memory (EEPROM), a flash memory or other disk storage; a compact disc read-only memory (CD-ROM), a digital versatile disc (DVD) or other optical storage; a cassette, a magnetic tape, a magnetic disk storage or other magnetic storage device; or any other medium which can be used to store the desired information and which can be accessed by a computer. In addition, as is known to those having ordinary skills in the art, the communication medium typically includes computer-readable instructions, data structures, program modules, or other data in a modulated data signal such as a carrier wave or other transport mechanism, and can include any information passing medium.

In an embodiment of the present disclosure, according to the key performance indicators of the subnet and the cells (or the parameter statistics of all the cells) when the anomaly occurs, the anomaly contribution degree of each cell in the subnet, i.e., the possibility of each cell in the subnet causing the anomaly, is determined. Therefore, compared to the related technologies in which the anomaly contribution degrees of the cells are determined based only on the key performance indicators of the cells in the subnet, the method of the embodiments of the present disclosure can more accurately determine the problem cell(s) (i.e., the cell(s) that actually cause the anomaly) according to the anomaly contribution degrees, thereby facilitating follow-up targeted network optimization and improving user experience.

In addition, the embodiments of the present disclosure may be implemented in an automated manner without manual intervention, are not affected by the human factor, and are fast, intelligent and accurate.

The embodiments have been disclosed in the present disclosure, and although specific terms are employed, they are used and should only be construed in a general descriptive sense and not for purposes of limitation. In some examples, it will be apparent to those having ordinary skills in the art that unless expressly stated otherwise, a feature, characteristic, and/or element described in conjunction with a particular embodiment may be used alone or in combination with a feature, characteristic, and/or element described in conjunction with another embodiment. Therefore, it will be understood by those having ordinary skills in the art that various changes in form and details may be made without departing from the scope of the present disclosure as set forth in the appended claims.

The invention claimed is:

1. A method for identifying a problem cell, comprising:
determining an anomaly contribution degree of each cell in a subnet; and
determining at least one cell as a problem cell according to the anomaly contribution degree of each cell in the subnet; wherein,
the anomaly contribution degree of each cell is, when an anomaly occurs in a key performance indicator of the subnet, a degree of correlation between a key performance indicator of the cell and the anomaly;
the key performance indicator of the subnet being anomalous means that the key performance indicator of the subnet exceeds a first threshold range;
the key performance indicator of the subnet is determined according to parameter statistics of the cells in the subnet; and
the key performance indicator of the cell is determined according to parameter statistics in the cell;
wherein the key performance indicator is a ratio-type key performance indicator, and the ratio-type key performance indicator is a ratio of a first parameter statistic to a second parameter statistic; and
the anomaly contribution degree of each of the cells indicates a degree to which the key performance indicator of the subnet after removal of the cell from the subnet is shifted toward the first threshold range relative to the key performance indicator of the subnet before the removal of the cell from the subnet.

2. The method of claim 1, wherein the first threshold range comprises:
a lower limit of the first threshold range and/or an upper limit of the first threshold range.

3. The method of claim 1, wherein:
the first threshold range is determined by a dynamic threshold detection technique.

4. The method of claim 1, wherein determining at least one cell as a problem cell according to the anomaly contribution degree of each cell in the subnet comprises:
sorting the cells of which the anomaly contribution degrees are positive in a descending order to obtain a sequence to be screened, and setting N to 1;
determining an optimized key performance indicator, wherein the optimized key performance indicator is a difference between the key performance indicator of the subnet and a temporary key performance indicator of the subnet, and the temporary key performance indicator is an overall key performance indicator of remaining cells in the subnet after top N cells are removed from the sequence to be screened;
determining the top N cells in the sequence to be screened as candidate cells, in response to the optimized key performance indicator being within the first threshold range;
increasing N by 1 and returning to the step of determining the optimized key performance indicator, in response to the optimized key performance indicator exceeding the first threshold range; and
determining at least some of the candidate cells as problem cells.

5. The method of claim 4, wherein determining at least some of the candidate cells as problem cells comprises:
determining a plurality of historical key performance indicators of each of the candidate cells, wherein each of the plurality of historical key performance indicators is a key performance indicator of the cell at a historical moment before the anomaly occurs in the key performance indicator of the subnet;
determining a historical abnormal proportion of each of the candidate cells, wherein the historical abnormal proportion of each of the cells is a proportion of the historical key performance indicators that exceed the first threshold range among all the historical key performance indicators of the cell; and
removing the cells of which the historical abnormal proportions are higher than a second threshold from the candidate cells.

6. The method of claim 5, wherein after removing the cells of which the historical abnormal proportions are higher than a second threshold from the candidate cells, the method further comprises:
determining, in response to a presence of remaining candidate cells, all the remaining candidate cells as problem cells; and
determining, in response to absence of remaining candidate cell, a first predetermined number of cells corresponding to largest anomaly contribution degrees as problem cells.

7. A non-transitory computer-readable medium, storing a computer program which, when executed by a processor, causes the processor to perform the method for identifying a problem cell of claim 1.

8. A method for identifying a problem cell, comprising:
determining an anomaly contribution degree of each cell in a subnet; and
determining at least one cell as a problem cell according to the anomaly contribution degree of each cell in the subnet; wherein,
the anomaly contribution degree of each cell is, when an anomaly occurs in a key performance indicator of the subnet, a degree of correlation between a key performance indicator of the cell and the anomaly;
the key performance indicator of the subnet being anomalous means that the key performance indicator of the subnet exceeds a first threshold range;
the key performance indicator of the subnet is determined according to parameter statistics of the cells in the subnet; and
the key performance indicator of the cell is determined according to parameter statistics in the cell;
wherein the key performance indicator is a numerical key performance indicator, and the numerical key performance indicator is a parameter statistic; and
the anomaly contribution degree of each of the cells is determined according to a ratio of a key performance indicator deviation value of the cell to a key performance indicator deviation value of the subnet, wherein the key performance indicator deviation value of each of the cells is a difference between the key performance indicator of the cell and a predicted key performance indicator of the cell, the key performance indicator deviation value of the subnet is a difference between the key performance indicator of the subnet and a predicted key performance indicator of the subnet, and the predicted key performance indicator of each of the cells is a predicted normal value of the key performance indicator of the cell, and the predicted key performance indicator of the subnet is a sum of the predicted key performance indicators of the cells in the subnet.

9. The method of claim 8, wherein:

the predicted key performance indicator of each of the cells is an average value of key performance indicators of the cell within a predetermined time period before the anomaly occurs in the key performance indicator of the subnet.

10. The method of claim 8, wherein determining at least one cell as a problem cell according to the anomaly contribution degree of each cell in the subnet comprises:

determining a third threshold according to the anomaly contribution degrees of all the cells of which the anomaly contribution degrees are positive, wherein the third threshold is a positive number;

determining, in response to a presence of a cell of which the anomaly contribution degree exceeds the third threshold, all the cells of which the anomaly contribution degrees exceed the third threshold as problem cells; and determining, in response to absence of a cell of which the anomaly contribution degree exceeds the third threshold, a second predetermined number of cells corresponding to largest anomaly contribution degrees as problem cells.

11. The method of claim 10, wherein the third threshold is calculated by the following formula:

third threshold=an average value of the anomaly contribution degrees of all the cells of which the anomaly contribution degrees are positive+ $k$*standard deviation of the anomaly contribution degrees of all the cells of which the anomaly contribution degrees are positive, wherein k is a value greater than 0.

12. The method of claim 8, wherein the first threshold range comprises:

a lower limit of the first threshold range and/or an upper limit of the first threshold range.

13. The method of claim 8, wherein:

the first threshold range is determined by a dynamic threshold detection technique.

14. An electronic device, comprising:

one or more processors; and a memory, storing one or more programs which, when executed by the one or more processors, cause the one or more processors to perform the method for identifying a problem cell of claim 8.

15. A non-transitory computer-readable medium, storing a computer program which, when executed by a processor, causes the processor to perform the method for identifying a problem cell of claim 8.

16. An electronic device, comprising:

one or more processors; and a memory, storing one or more programs which, when executed by the one or more processors, cause the one or more processors to perform a method for identifying a problem cell, the method comprising:

determining an anomaly contribution degree of each cell in a subnet; and determining at least one cell as a problem cell according to the anomaly contribution degree of each cell in the subnet, wherein, the anomaly contribution degree of each cell is, when an anomaly occurs in a key performance indicator of the subnet, a degree of correlation between a key performance indicator of the cell and the anomaly;

the key performance indicator of the subnet being anomalous means that the key performance indicator of the subnet exceeds a first threshold range;

the key performance indicator of the subnet is determined according to parameter statistics of the cells in the subnet; and the key performance indicator of the cell is determined according to parameter statistics in the cell;

wherein the key performance indicator is a ratio-type key performance indicator, and the ratio-type key performance indicator is a ratio of a first parameter statistic to a second parameter statistic; and the anomaly contribution degree of each of the cells indicates a degree to which the key performance indicator of the subnet after removal of the cell from the subnet is shifted toward the first threshold range relative to the key performance indicator of the subnet before the removal of the cell from the subnet; and one or more I/O interfaces, connected between the one or more processors and the memory, and configured to perform information exchange between the one or more processors and the memory.

* * * * *